United States Patent
Muller et al.

[11] Patent Number: 5,751,156
[45] Date of Patent: May 12, 1998

[54] MECHANICALLY CONTROLLABLE BREAK TRANSDUCER

[75] Inventors: Christiaan Muller; Chong Wu Zhou, both of New Haven; Mark A. Reed, Southport, all of Conn.

[73] Assignee: Yale University, New Haven, Conn.

[21] Appl. No.: 486,960

[22] Filed: Jun. 7, 1995

[51] Int. Cl.$^6$ .......................... G01R 19/00; G01R 27/14
[52] U.S. Cl. .......................... 324/699; 324/715; 324/716
[58] Field of Search .................................. 324/699, 713, 324/715, 716

[56] References Cited

U.S. PATENT DOCUMENTS

| | | | |
|---|---|---|---|
| 4,823,004 | 4/1989 | Kaiser et al. | 250/306 |
| 4,861,990 | 8/1989 | Coley | 250/306 |
| 5,552,718 | 9/1996 | Bruce et al. | 324/699 |
| 5,585,734 | 12/1996 | Meuris et al. | 324/715 |

OTHER PUBLICATIONS

T. W. Kenny, S. B. Waltman, J. K. Reynolds, and W. J. Kaiser, "Micromachined silicon tunnel sensor for motion detection," Appl. Phys. Lett. 58, 100 Jan. 1991.

H. K. Rockstad, T. W. Kenny, J. K. Reynolds, W. J. Kaiser, and T. B. Gabrielson, "A miniature high-sensitivity broad-band accelerometer based on electron tunneling transducers", Sensors and Actuators A 43, 107 (1994). (month unavailable).

G. Kaminsky, "Micromachining of silicon mechanical structures," J. Vac. Sci. Technol. B 3, 1015 (Jul. 1985).

Th. B. Gabrielson, "Mechanical-Thermal Noise in Micromachined Acoustic and Vibration Sensors," IEEE Trans. on Electron Devices 40, 903 (May 1993).

J. M. Krans, C. J. Muller, I. K. Yanson, Th. C. M. Govaert, R. Hesper and J. M. van Ruitenbeek, "One-atom point contacts," Phys. Rev. B 48 (Nov. 1993) 14721.

C. J. Muller, J. M. van Ruitenbeek and L. J. de Jongh, "Conductance and Supercurrent Discontinuites in Atomic-scale Metallic Constrictions of Variable Width," Phys. Rev. Lett 69 140, Jul. 1992.

J. I. Pacual, J. Mendez, J. Gomez-Herrero, A. M. Baro, N. Garcia and Vu Thien Binh, "Quantum Contact in Gold Nanostructures by Scanning Tunneling Microscopy," Phys. Rev. Lett. 71 1852, Sep. 1993.

(List continued on next page.)

*Primary Examiner*—Glenn W. Brown
*Attorney, Agent, or Firm*—Fish & Richardson P.C.

[57] ABSTRACT

A micromechanical sensor in which the impedance of a gap in a conductor, under tunnelling current conditions, is sensed to provide an indication of deflection in the conductor. This provides a new way to sense acceleration, strain, and other parameters which can be translated into a deflection.

23 Claims, 10 Drawing Sheets

OTHER PUBLICATIONS

L. Olesen, E. Laegsgaard, I. Stensgaard, F. Besenbacher, J. Schiotz, P. Stoltze, K. W. Jacobsen, and J.K. Norskov, "Quantized Conductance in an Atom–Sized Point Contact," Phys. Rev. Letters, 72 (Apr. 1994) 2251.

R.J. Roark and W.C. Young, Formulas for Stress and Strain, Chap. 7, (McGraw–Hill, New York, 1975), p. 89.–208, (month unavailable).

C.J. Muller, J.M. van Ruitenbeek and L.J. de Jongh, "Experimental observation of the transition from week link to tunnel junction," Physica C 191 (1992) 485. (month unavailable).

J. Moreland and J. W. Ekin, "Electron tunneling experiments using Nb–Sn 'break' junctions," J. Appl. Phys. 58 (Nov. 1985) 3888.

A. N. Omelyanchouk, R. de Bruyn Ouboter and C. J. Muller, "Influence of interface roughness and point–like defects on the Josephson current in superconducting break junction," Low Temp. Phys. 20 398, May 1994.

K. E. Petersen, "Dynamic Micromechanics on Silicon: Techniques and Devices," IEEE Trans. on Elec. Dev., ED–25 (Oct. 1978) 1241.

Muller et al., "Observation of the 'skew supercurrent' in Josephson vacuum barrier tunnel junctions as a function of the junction normal resistance" 194–196 Physica B 1043 (1994) (month unavailable).

Muller et al., "Reduction of the Andreev scattering processes in ultra–small superconducting point contacts with direct conductivity," 220 Physica C 258 (1994) (month unavailable).

Muller et al., "Atomic size superconducting point contacts in the presence of a microwave field," T49A Physica Scripta 219 (Apr. 1993).

Muller et al., "Classical limit of microwave detection in atomic–sized superconducting contacts," 48 Physical Review B 10622 (Oct. 1993).

Muller et al., "Conductance and supercurrent discontinuities in atomic size point contacts," 189 Physica B 225 (1993) (month unavailable).

Muller et al., "Adjustable point contacts and tunnel junctions for sub–atomic distances" 17 Nederlands Tijdschrift voor Natuurkunde 275 (1992) (month unavailable).

*Research Matters* Perspectives on the world of low temperature research from Oxford Instruments, "Cantilever Magnetometry gets smaller . . . and smarter", Spring. 1996 (month unavailable) Issue 4.

Muller, C. J., "An experimental study on mechanically controllable break junctions," pp. 1–105, Dec. 1962.

MECHANICALLY CONTROLLABLE BREAK TRANSDUCER

This invention was made with government support under Grant Number N00014-92-5-1689 awarded by the Office of Naval Research. The government has certain rights in the invention.

BACKGROUND AND SUMMARY OF THE INVENTION

The present invention relates to sensors, and particularly to microelectronic sensors.

Background: Physics of Tunnel Gaps

Recently it has become possible to position two electrodes with unprecedented stability at arbitrary relative positions with respect to each other. In such systems three regions of interest can be discerned: the tunnel regime, the contact or conduction regime, and the transition between the two. (In addition, of course, a fourth regime is of less interest, i.e. when the electrodes are too far apart to sense tunnel current.)

Between two separated electrodes some two atoms on the opposite electrodes will be nearest to each other (due to the atomic roughness of the electrodes) and tunneling will occur between these two atoms when the electrode separation is reduced towards atomic dimensions (on the order of 5 Å). When the electrode separation is reduced even further the transition to contact occurs jumpwise. For the same reason that tunneling takes place between two nearest atoms, the jump to contact will initially involve only one atom which bridges the electrodes. When the electrodes are brought even closer, that is if pressure is exerted on this single atom contact, an atom by atom increase of the constriction region between the electrodes will take place.

A number of interesting phenomena have been observed in such systems Krans et al. reported about the conductance value of single atom contacts. (See Krans et al., "One atom point contacts," 48 PHYS. REV. B 14721 (1993); Krans et al., "One atom point contacts," 194–196 PHYSICA B 1033 (1994).) They found that this value showed some statistical mean which depends on the material. For copper this value was closely centered around the fundamental conductance unit $2e^2/h$. It has been demonstrated that in the contact regime one atom could be reproducibly positioned in and out of the constriction region by manipulating the electrodes, thus influencing the conductance stepwise by an amount of the order of $2e^2/h$. (See Muller et al., "Conductance and supercurrent discontinuities in atomic-scale metallic constrictions of variable width," 69 PHYS. REV. LETT. 140 (1992).) The electrodes could be positioned and held stable to such an extent that the switching of this atom back and forth between two energetically equal sites could be studied. Even the duty cycle of this two level fluctuation system can be manipulated by fine tuning the position of the two electrodes. Yanson et al. studied the electrode material of noble metals doped with magnetic impurities (Mn) in the contact regime with constriction diameters between 2 and 100 nm. (See Yanson et al., 74 PHYS. REV. LETT. 302 (1995).) They used point contact spectroscopy as a tool to obtain information about the Kondo temperature in these systems. An anomalous increase of this Kondo temperature is observed for the smaller contacts. In the tunnel regime van de Post et al. investigated subgap structure with superconducting electrodes. (See N. van der Post et al., 73 PHYS. REV. LETT. 2611 (1994).) Subgap structure had been observed in point contacts. By many it was believed that subgap structure showing up in planar oxide barrier tunnel junctions was due to micro shorts penetrating the barrier. In the van der Post paper cited above it was shown that this structure also occurs in vacuum barrier tunnel junctions, moreover due to the ability to adjust the barrier it was possible to study this structure over many orders of magnitude in the resistance while the electrodes remained exactly the same. In this way van de Post et al. were able to confirm existing theories on this matter. Another interesting contribution from Krans et al. was performed with antimony electrodes. (See Krans and Ruitenbeek, 50 PHYS. REV. B. 17659 (1994).) Sb is a semimetal and has a Fermi wavelength which is about ten times larger than in normal metals. They studied contact formation and found many steps in the conductance (much smaller than $2e^2/h$), when they reduced the constriction towards atomic dimensions—thus presenting clear evidence that atomic rearrangements (not conductance quantization) are responsible for the conductance steps. This may seem obvious, but there have been a number of claims on conductance quantization in atomic size metal point contacts made with the STM. (See Pascual et al. 71 PHYS. REV. LETT. 1852 (1993); Olesen et al., 72 PHYS. REV. LETT. 2251 (1994).) In normal metals the Fermi wavelength is of the same order as the atomic diameter, and thus an additional atom in the constriction will add of the order of $2e^2/h$ to the conduction. When the stability of the system or the measurement resolution is not good enough these $2e^2/h$ order of magnitude steps can easily be misinterpreted as showing conductance quantization. (See Krans et al., 74 PHYS. REV. LETT. 2146 (1995).) As a last example Vleeming et al. studied one atom point contacts in the superconducting state. (See Vleeming et al., "Single-atom point contacts in the superconducting state," 50 PHYS. REV. B 16741 (1994).) They were able to break and reestablish this contact in a reproducible way. The effect of a pressure or a tensile force on the single bridging atom was shown to have a large influence on the superconducting properties whereas the influence on the normal resistance is relatively small.

FIG. 1d shows a testbed setup for making nanoscale gaps and characterizing their properties. The first stage of any experiment with gap-tunnelling devices is to break the electrode material at the notch. This can be performed in any type of environment; so far experiments have been performed in UHV both at room temperature and at helium temperatures (0.5–4.2K), at ambient conditions, in liquid helium and in a solvent containing molecules at room temperature. This breaking can be achieved with the use of a coarse adjustment (using an electromotor) which moves the piezo element in FIG. 1d towards the bending beam resulting in a deflection of the beam. This deflection results in a small elongation ($\epsilon$) of the upper part of the beam and a reduction in length ($\epsilon$) for the lower part of the beam. This implies that the unglued section u also elongates an amount $u\epsilon/L_S$. Since the metal wire is thin only over the length $L_{ef}$, the complete elongation of u will be concentrated on $L_{ef}$ so the ratio $u/L_{ef}$ determines the stress concentration factor. We would like this factor to be large, but for stability reasons we would like to have u as small as possible, which means a trade off in numbers.

A typical value for the strain needed in a metal to break it is 5%. So in theory when $u/L_{ef}>5$ the filament will break at the notch when 1% strain is applied to the bending beam. Once the filament is broken the motor direction is reversed, resulting in a relaxation of the force on the beam, until a contact between the two freshly broken electrodes is reestablished. At this point it is important to note that the beam is still under a strain due to the fact that the material in the $L_{ef}$ region is deformed and elongated before the fracture. As long as the beam is strained it is possible to adjust the junction. In practice we can apply more than 5% strain on the bending beam which will result in a deformation of the metal beam. Nevertheless, when the electrode material is broken there is still enough strain in the deformed beam to reestablish a contact by reducing the force on the beam. So the metal bending beam is a self regulating system which makes the depth of the notch or equivalently $L_{ef}$ non-critical. For this reason we obtain a 100% yield with our samples in breaking the electrode material and reestablishing contact.

After a contact is reestablished between the fractured electrodes a voltage on the piezo element is used for fine adjustment of the coupling between the two electrodes. A crucial property of this device is that the electrodes can be positioned with respect to each other over minute distances with the use of the piezo element. When the piezo elongates e.g. 1 nm the electrodes separate by an amount much smaller than this due to a reduction factor which is imposed by the sample geometry. In the following an expression for this reduction factor will be derived, When a force F is exerted via the piezo on the bending beam (thickness h, width w) the length change in the upper and lower surfaces $\epsilon$ with respect to equilibrium can be expressed as:

$$\epsilon = FhL_s^2/16EI, \quad I = wh^3/12. \tag{1}$$

(See R. J. Roark and W. C. Young, FORMULAS FOR STRESS AND STRAIN 89 (1975).) Here E is the elasticity modulus of the material which forms the bending beam. The influence of the insulating foil is neglected since its thickness, e.g. 100 μm, is negligible compared to the 1 mm thickness of the metal beam.) The expression between the force F and the displacement of the piezo, y, in the force direction is:

$$y = FL_s^3/48EI \tag{2}$$

Assuming a uniform extension of the beam in the elastic limit results in an electrode displacement $\Delta$ given by $\Delta = \epsilon u/L_S$. The reduction factor r given by $y/\Delta$ is expressed as follows:

$$r = L_s^2/3uh \tag{3}$$

Typical values (of e.g. $L_S \approx 20$ mm, $h \approx 1$ mm, $u \approx 100$ μm) result in $r \approx 10^3$, which implies that 1 nm piezo length increase results in a 1 pm electrode separation. (Thus the mechanical gain of this transducer may be increased by increasing u or h or decreasing Ls. However, gain would be increased only if necessary, since it is an advantage of this device that we have reduced the displacement to about a few Angstrom range. The raw displacements which must be sensed are typically much larger than this.)

From various experiments using the exponential dependence of the resistance on the tunnel distance it was discovered that the reduction factor for our devices lies between $10^2$ and $10^3$, often closer to $10^2$ than to $10^3$. Because the electrode material has to be broken prior to mechanical adjustment of the contact this device was called a mechanically controllable break (MCB) junction. (See Muller et al., 191 PHYSICA C 485 (1992).) The idea of an adjustable tunnel junction on a flexible substrate was launched by Moreland et al. in 1985. (See Moreland and Ekin, 58 J. APPL. PHYS. 3888 (1985).)

After the electrodes are broken, contacts or vacuum barriers of arbitrary sizes can be adjusted. In the following we will give some arguments why single atom point contacts can be adjusted in an inherently stable manner. When a vacuum gap is adjusted between the two electrodes somewhere tunneling will occur between two nearest atoms on opposite electrodes. In this respect we should keep in mind that the diameter of a metal atom is about 2 Å and that the tunnel probability decays by a factor of 100 over this distance in vacuum. Since both electrodes are rough on an atomic scale (as shown in FIG. 5), the majority of the current will tunnel between two atoms. This is also the reason why the STM works, making it possible to map surfaces with subatomic resolution. So if tunneling always takes place between two nearest atoms why is there so much effort spent in the STM world to make sharp tips? That is because the STM takes scans of surfaces which are not always atomically flat. If a STM tip has multiple tips close to the surface, tunneling can change from one tip to another during the scan if e.g. a terrace is approached. This unwanted effect can be avoided by having only one tip. Despite this possible multiple tip effect during scanning, no matter what the electrode geometry looks like, if the distance between the electrodes is reduced to tunnel distance ($\approx 5$ Å) tunneling will occur between two nearest atoms due to the atomic roughness of our two electrodes after breaking. When the tunnel distance is carefully diminished by reducing the piezo voltage, at some stage the two atoms that are nearest will form a single atom point contact irrespective of the electrode geometry. Moreover, experiments with MCB's show a well defined minimum conductance in the contact regime which is measured reproducibly during contact formation (tunnel regime to one atom contact) or contact breaking (one atom contact to tunnel regime).

The extreme stability of the two electrodes with respect to each other observed in the MCB device is in part due to the small distance u between the two glue contacts. The size of the loop, electrode—glue contact—bending beam—glue contact—electrode, determines a resonance frequency where the system can couple to. For our devices this frequency is typically in the MHz range, which is much higher then acoustical frequencies. The stability is also due to the large reduction factor. Possible vibrations of the piezo part with respect to the beam, due to electrical or acoustical noise, are attenuated by a factor r before being transferred to the electrodes. A typical stability obtained at low temperatures in the tunnel regime is 1 fv/Hz$^{1/2}$. In the contact regime stability measurements are limited by equipment noise. A constant temperature is important for our hand made devices since room temperature measurements sometimes show some drift due to temperature variations.

In comparing the described device with a STM we observe the following major differences:

a) the MCB makes no use of a feedback system and has no possibility to scan.

b) the MCB uses a reduction factor in order to obtain an extreme stable electrode configuration.

At this point we comment that the STM is capable of doing the same experiments as performed with the MCB. However, we claim that the higher stability of the MCB results in more control in the experiments at the atomic level and a better resolution and signal to noise ratio in I-V curves. Although the STM is a more versatile instrument there are regimes, especially when scanning is of no interest, which can be studied in more detail with the MCB.

The above mentioned examples illustrate that physics at the atomic level can be studied with the use of adjustable microscopic contacts and transport measurements.

Novel Transducer

The present application discloses new transducer and sensor structures and sensing methods, using detection of the impedance of a tunnel gap of a few Ångstroms. The condition to be detected is transformed into variations in the tunnel gap, which produce corresponding variation in the impedance of the gap. This impedance variation is then easily detected.

Preferably the sensor structure is formed by microelectronic fabrication methods on a silicon substrate, and transistors (preferably bipolar) in the substrate provide at least a first stage of gain.

The novelty of this type of tunnel sensor over other types is the possibility to transform the conditions to be detected into Ångstrom scale variations in a tunnel gap, allowing for direct detection via the resistance of this gap. The reason for this is twofold:

1) the actual element or device which contains the electrodes is very small (on the order of 1 μm).
2) There is a large reduction factor in the signal transformation to a tunnel gap variation.

In contrast to many existing sensors this sensor can be made very small, and produced in large quantities, using standard silicon technology.

Transducers are used in sensors to transform a signal to be detected, e.g. a pressure value, into another signal e.g. a resistance value, which is easy to process. The proposed new type of transducer may be used in a variety of sensors. Due to a number of design parameters there is enough engineering freedom to fabricate a sensor for a specific application or regime. This transducer may be used in: pressure sensors, position sensors, accelerometers, velocity meters, force sensors, flow sensors, temperature sensors etc. (A cheap durable accelerometer is especially needed by the automotive industry, to detect the beginning of a collision and trigger airbag detonators (or other safety systems). Other applications include microphones and spectrometers.

The disclosed innovative transducer is readily fabricated using standard integrated circuit fabrication techniques. The only nonstandard process required is making the break in a narrowed conductor. However, the concentration of stress when a line is necked down makes break occurrence almost inevitable.

In alternative embodiments, multiple tunnelling junctions are located on a single chip. These can be used to provide differential inputs for better detection of the sensed data.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1A:
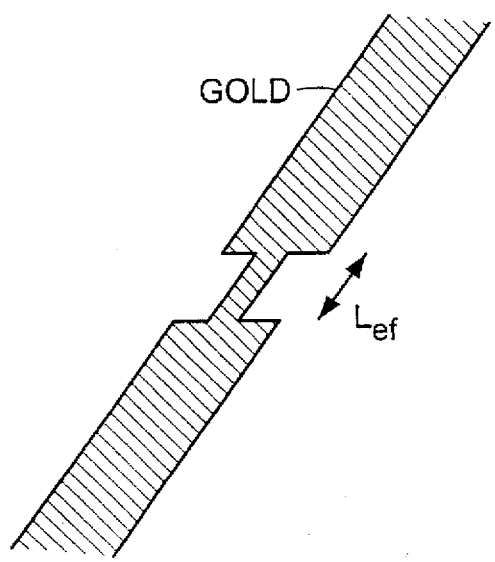
FIG. 1a shows a first stage of processing in fabricating a sample embodiment.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

First a proof-of-principle experiment will be described, which demonstrated fabrication of a Mechanically Controllable Break transducer using microelectronic fabrication techniques on a silicon substrate. Thereafter additional details will be presented regarding the complete sensor structure, and several alternative embodiments will be described.

Following is a detailed description of the fabrication and operation at room temperature of a novel type of tunnel displacement transducer. Instead of a feedback system it relies on a large reduction factor assuring an inherently stable device. Stability measurements in the tunnel regime infer an electrode stability within 3 pm in a 1 kHZ bandwidth. In the contact regime the conductance takes on a discrete number of values when the constriction is reduced atom by atom. This reflects the conduction through discrete channels.

Micromachining in silicon is an ongoing effort to provide ever smaller devices used as the active part of a sensor. Currently, it is straight forward to produce suspended beams, small springs, and vibrating or rotating structures on a chip. Engineers can make use of a number of classical transducer phenomena, such as piezoelectricity, piezoresistivity and capacitance changes to convert displacements into an electrical signal. However, the formation of smaller sensors is often obtained at the cost of precision, since the signal of the above mentioned transducer phenomena scale with size. In contrast to classical transducers, a tunnel transducer (e.g., an STM) is compatible with further miniaturization and possesses an astonishing sensitivity to displacements. When a vacuum tunnel gap between two metallic electrodes is increased by 1 Å, the tunnel resistance increases approximately by an order of magnitude. This has been realized by a number of groups who have used tunnel sensors in devices. (See Kenny et al., 58 APPL. PHYS. LETT. 100 (1991); Rockstad et al. 43 SENSORS AND ACTUATORS A 107 (1994) and references therein; all of which are hereby incorporated by reference.) The extreme sensitivity of these sensors on positional displacements however implies that the practical range of operation is limited to distances smaller than 5 Å since at larger distances the resistance becomes almost infinite and unmeasurable.

In conventional STM embodiments, one electrode is usually mounted on a flexible lever, which can be moved by an electrical signal. The tunnel gap is kept constant with the use of a feedback system, necessary since temperature fluctuations, (acoustic) vibrations or other disturbances will otherwise change the vacuum gap over distances much larger than the practical range. An accelerometer, magnetometer and an infrared sensor have been successfully developed with these kind of tunnel sensors in feedback operation. (See Kenny et al., 58 APPL. PHYS. LETT. 100 (1991); Rockstad et al. 43 SENSORS AND ACTUATORS A 107 (1994) and references therein; all of which are hereby incorporated by reference.) Despite these successes there is a need for an inherently stable tunnel sensor (i.e. no feedback loop). The absence of a feedback loop facilitates the device fabrication and operation. The device operation is not limited by the bandwidth of a feedback system, and the system is less susceptible to unwanted mechanical or acoustical disturbances since long cantilevers are not necessary. The present application discloses a new type of tunnel sensor which is inherently stable, adjustable and compatible with silicon technology. Detailed measurements are shown, in both the contact and tunnel regime.

Figure 1B:
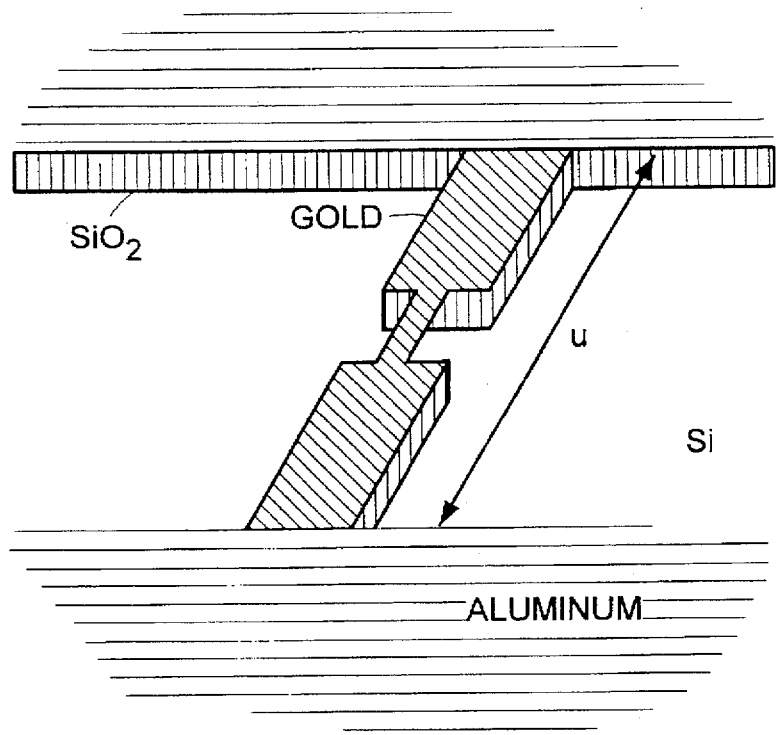
FIG. 1b shows a subsequent stage of processing, wherein both the aluminum and gold film are used as an etch mask to etch through the $SiO_2$ into the Si.
Figure 1C:
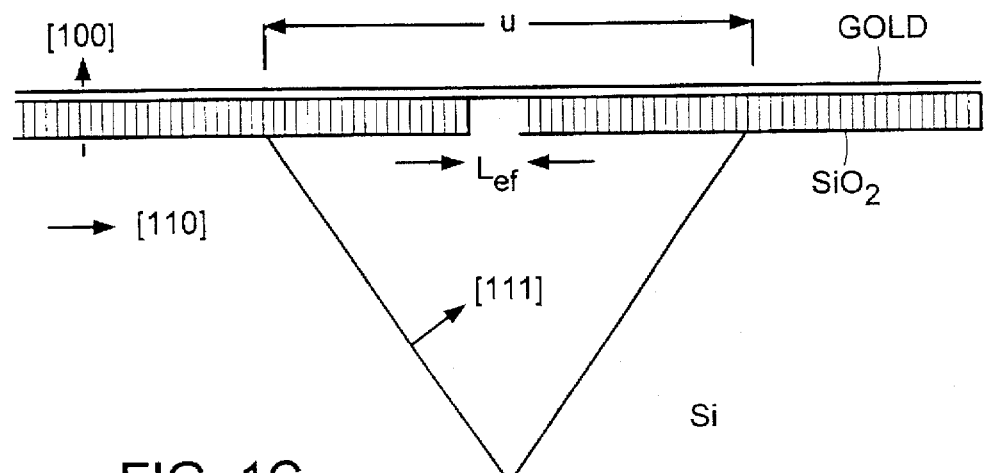
FIG. 1c shows a cross section along the gold wire after the pit is etched into the silicon.

The principle of operation and a schematic perspective and cross sectional view of the device are shown in FIGS. 1a–1d. The starting material is a <100> oriented 250 μm thick silicon wafer with an oxide layer of 400 nm. Standard electron-beam lithography is used to define a pattern in a PMMA bilayer used for the evaporation of an adhesion layer (10 Å Ti) and 800 Å of gold onto the oxide. The gold film has a shape as indicated in FIG. 1a: The smallest width of the wire is 100 nm, $L_{ef}$ is about 250 nm. Next a photolithographically defined thick layer of aluminum is evaporated everywhere on the oxide except over a distance u, centered around the smallest gold feature. The next step uses the gold and aluminum films as a mask to etch through the $SiO_2$ into the Si with a $CF_4/O_2$ plasma (FIG. 1b). The aluminum is, then removed using a standard wet etch. The last step is a wet etch of the exposed Si area using a pyrocatechol-ethylene-diamine mixture. (See G. Kaminsky, 3 J. VAC. SCI. TECHNOL. B 1015 (1985).) Since the two cantilevers are aligned with the <110> direction in the substrate, a triangular pit is etched into the silicon, bounded by the $SiO_2$ edges and the <111> surfaces. (That is, Si etching is stopped at the concave corners and the intersection between the <111> crystallographic surface and the $SiO_2$ edges.) Rapid undercutting at the convex corners by this etchant assures that the two cantilevers are free standing after the etching process. (See Petersen, 25 IEEE TRANS. ELECTRON DEVICES 124 (1978).) The final device consists of two small cantilever beams (2.5 μm long, 4 μm wide) connected with a 100 nm wide wire over a length $L_{ef}$ (FIG. 1c).

Figure 1D:
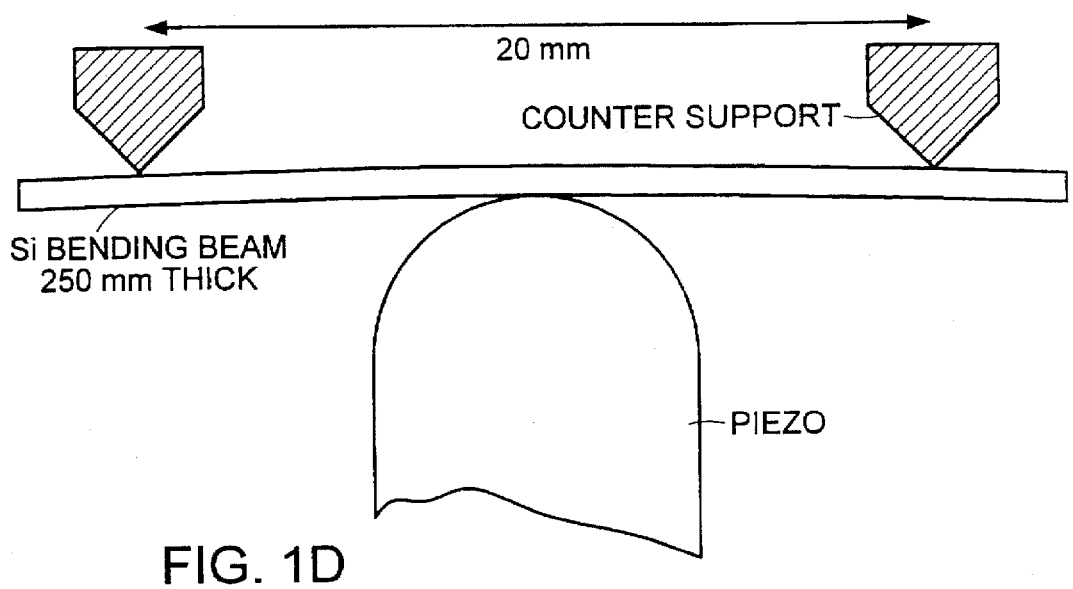
FIG. 1d shows a mounting configuration used to demonstrate the characteristics of a silicon bending beam in a break junction setup.

FIG. 1d shows a mounting configuration used to demonstrate the characteristics of a silicon bending beam in a break junction setup. The device is mounted against two counter supports, approximately 20 mm apart, in a break junction configuration. A force is exerted on the backside via the piezo element which is moved towards the device using a coarse adjustment screw. The silicon beam is strained, resulting in an elongation of the top layer. The elongation of u is concentrated on $L_{ef}$, resulting in the fracture of the gold wire while the Si substrate stays intact (even though gold is more ductile than silicon). The piezo element has a maximum elongation of 5 μm and is used for fine adjustment of either atomic size contacts or vacuum barrier tunnel junctions between the fractured gold electrodes.

Figure 2A:
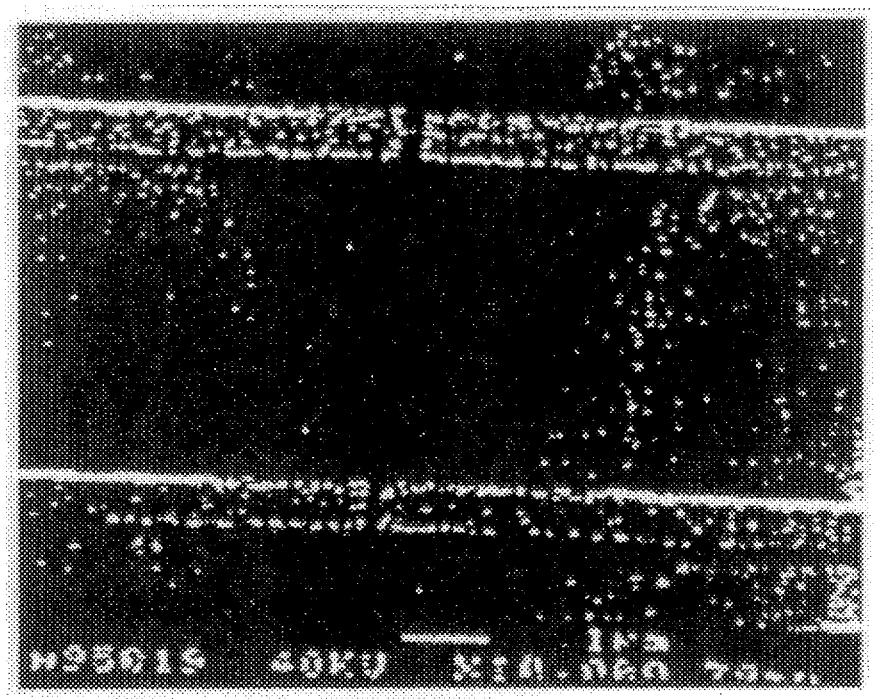
FIG. 2a is a micrograph showing two devices suspended above a triangular pit in the Si substrate.

FIG. 2a shows a SEM photograph of a device before the bridging wire is broken. A 100 nm wire bridging the two cantilevers can be seen, and a slight undercut of the gold is visible. The etched pit into the Si is bounded by a relatively rough $SiO_2$ edge, caused by the photolithography step. Some of the undercut below the $SiO_2$ layer results from this roughness and enlarges u to about 10 μm.

Experiments, in this demonstration, are performed at room temperature in a vacuum system ($10^{-7}$ Torr) which uses an oil-free absorption/ion-pump combination in order to reduce contamination of the exposed electrodes with hydrocarbons.

Figure 2B:
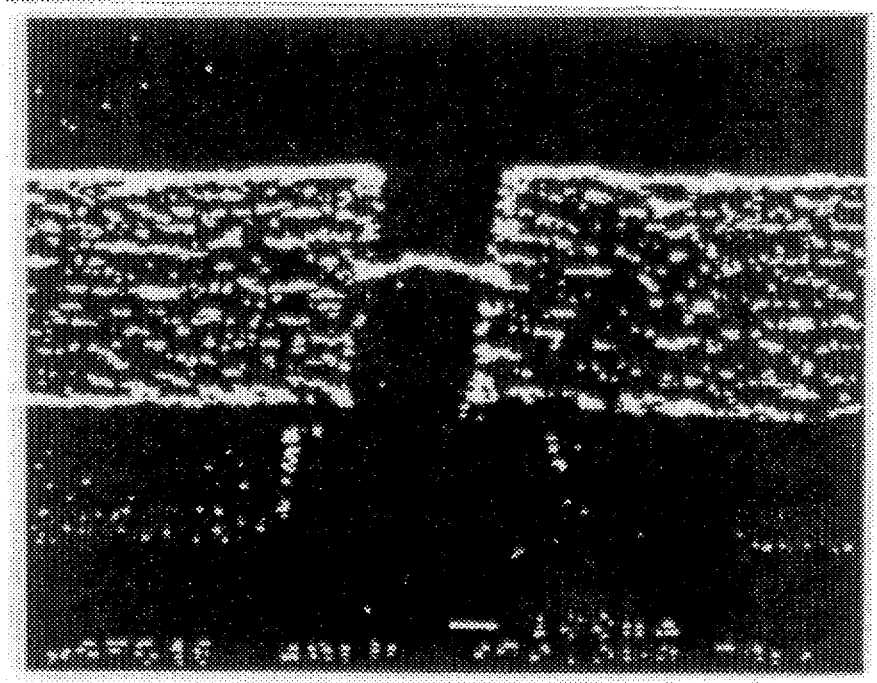
FIG. 2b is a close-up showing the connecting wire.

FIG. 2a is a micrograph showing two devices suspended above a triangular pit in the Si substrate before the connecting wire is broken in the break junction setup. Each device shows two $SiO_2$ cantilevers which are covered and bridged by the gold wire. FIG. 2b is a close-up showing the connecting wire. Before operating the device in the contact or tunnel regime the small connecting wire has to be broken. Some undercut of the gold is present due to the imperfection of the reactive ion etching process.

Figure 3:
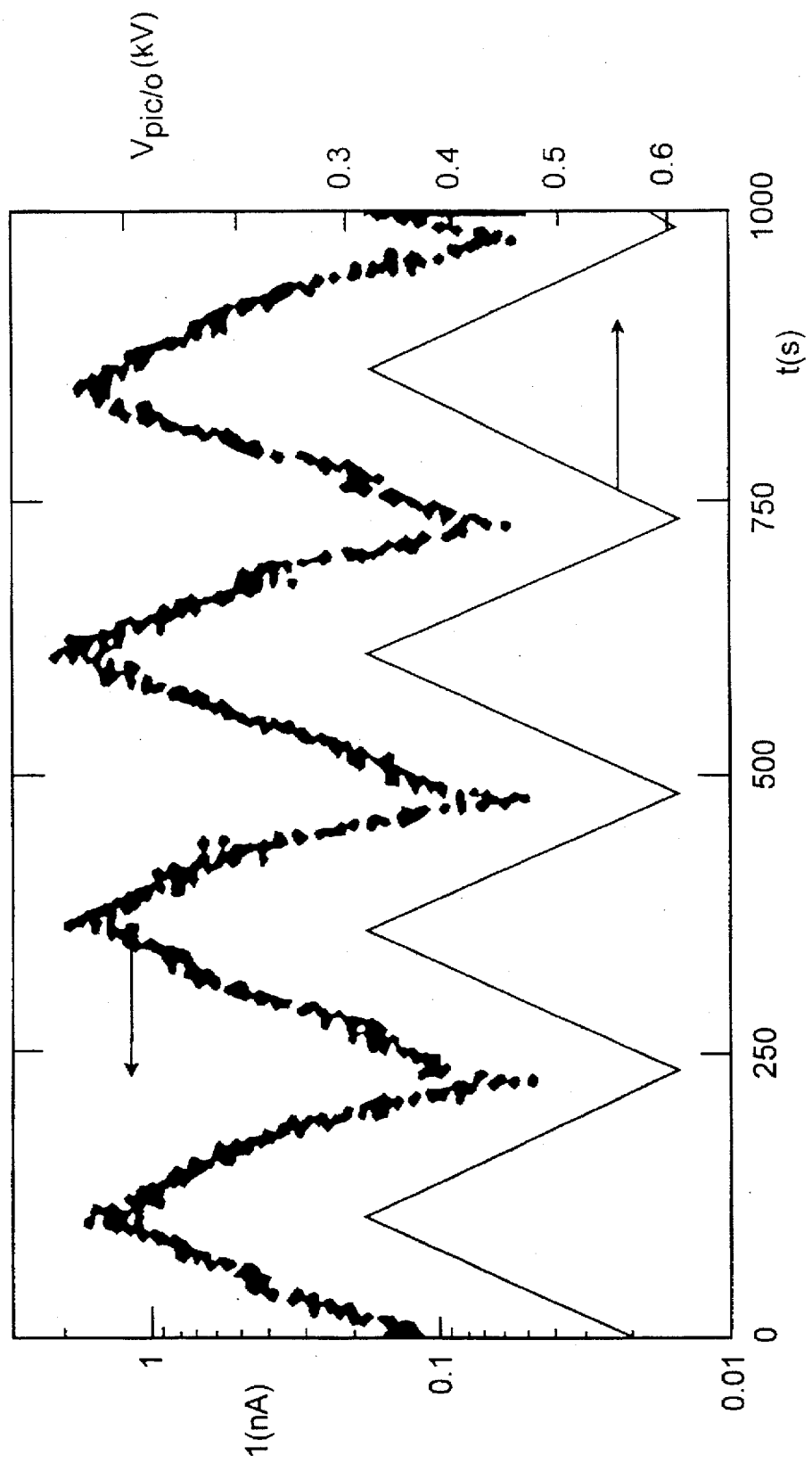
FIG. 3 is a plot of test results achieved using the test setup of FIG. 1d with the transducer structure of FIG. 1c.

FIG. 3 illustrates the long term stability and the exponential dependence of the tunnel current $I_t$ on the vacuum barrier gap distance of this device. The junction is biased at 100 mV while a triangular voltage wave is applied to the piezo element (lower curve in FIG. 3). The current (at a constant bias voltage) varies as shown in the upper curve. The almost linear behavior of the tunnel current on a logarithmic scale reflects the exponential dependence on electrode separation. Note the large time scale, indicating the long term stability of the junction. The variation in the piezo length induces a variation in the gap distance resulting in a change of the tunnel resistance (top curve in FIG. 3). The exponential dependence of $I_t$ on the gap distance s is given by:

$$I_t \propto \exp\{-\alpha\sqrt{(\Phi S)}\}$$

where $\alpha=1.025$ $Å^{-1}eV^{-\frac{1}{2}}$ and $\Phi$ is the workfunction of the gold electrodes. As the electrodes are displaced over about 2 Å the tunnel current changes over almost two orders of magnitude. The reason for this exceptional stability is the smallness of u which determines the reduction factor r (the ratio between the piezo elongation and the induced electrode separation). For our devices we estimate $r \approx 5 \times 10^4$. From two devices we experimentally infer, from the known piezo elongation and assuming an exponential dependence of the tunnel current, $r \approx 10^4$. The discrepancy of a factor of five may be due to non-uniform strain near the etched pit. In the tunnel regime the current noise amplitude, which depends on the tunnel resistance, is determined at a 100 mV bias for tunnel resistances between 100 kΩ and 10 MΩ in a 1 kHz bandwidth. In this resistance range the experimental value for the current noise amplitude implies about 3 pm fluctuations in the tunnel gap distance. Although we do not know the exact origin of these fluctuations, a detailed noise analysis should include the thermal agitation of the cantilever. (The resonance frequency of the cantilever is about 70 MHz. At room temperature it may be driven by $k_BT$ resulting in a deflection of about 1.5 pm. See Gabrielson, 40 IEEE TRANS. ON ELECTRON DEVICES 903 (1993).)

Figure 4:
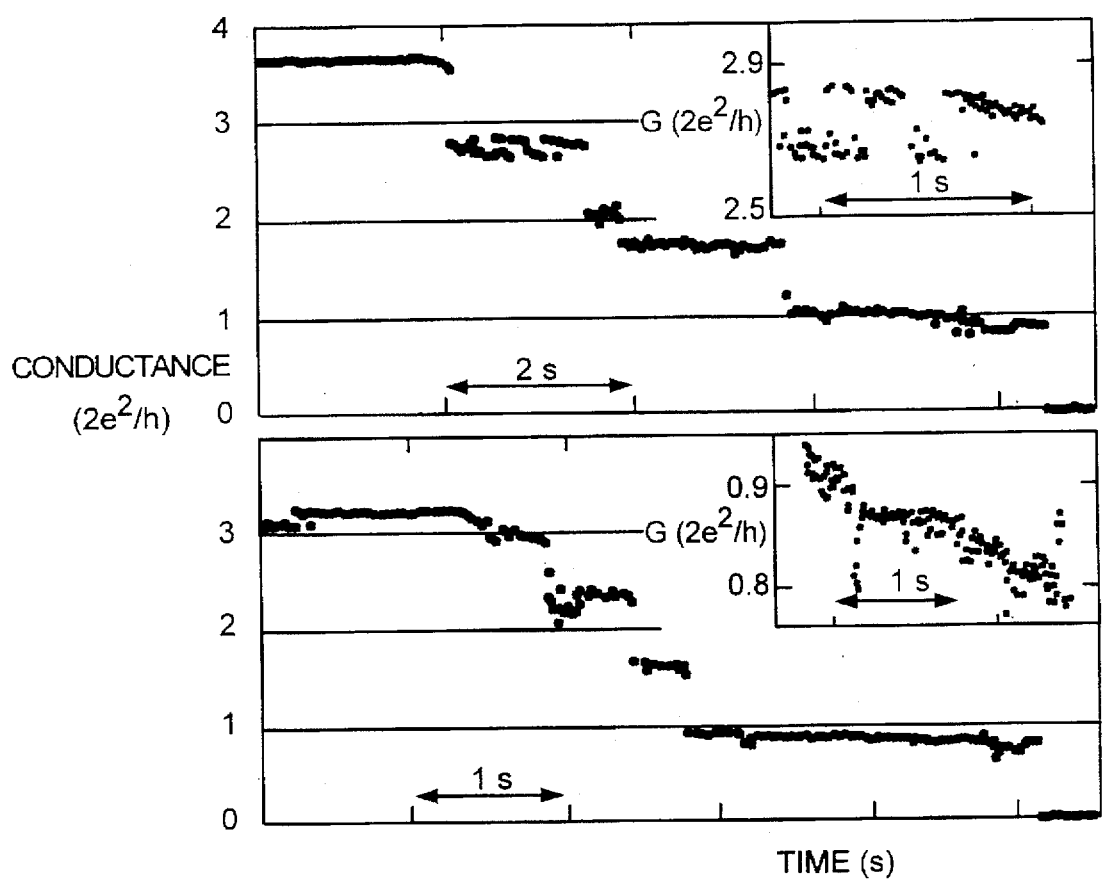
FIG. 4 shows two conductance traces recorded when an atomic scale contact reduces its cross section as a function of time.
Figure 5:
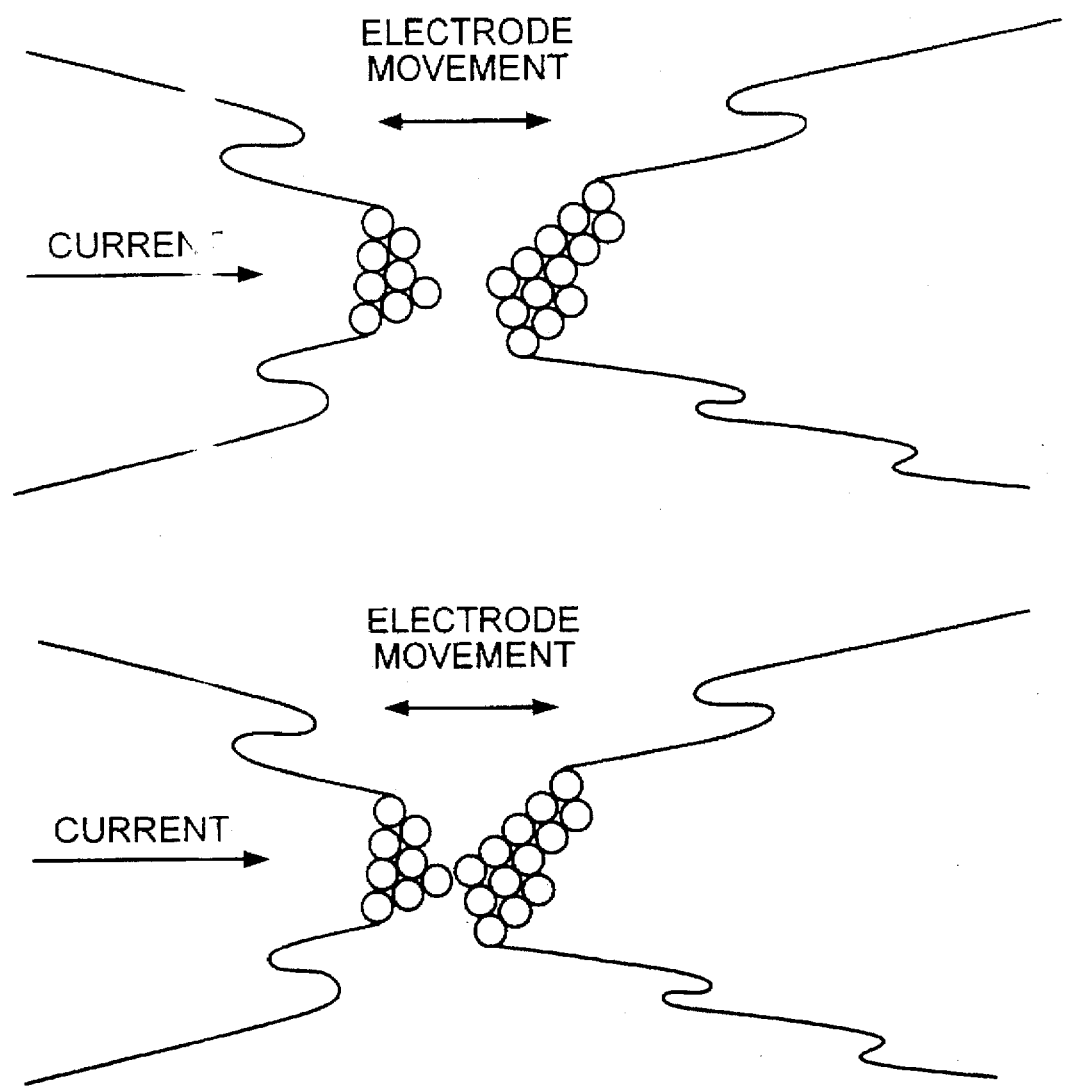
FIG. 5 shows how the roughness of the broken electrodes on an atomic scale ensures tunneling between two nearest atoms in the tunnel regime and conduction through a one atom contact when the electrodes are brought carefully closer together and the jump to contact has occurred.

When the electrodes are brought close enough together, a contact is formed. Experiments performed in the contact regime are done in the following way: the contact is reduced in size by increasing the piezo voltage until the conductance of the contact is approximately 10 times $2e^2/h$. Then the piezo voltage is fixed, and it is found that the contact relaxes by itself, until eventually a jump to the tunnel regime takes place. Before this jump occurs, the two electrodes may be bridged by a single atom. We tentatively attribute this effect to outdiffusion of atoms, thus decreasing the constriction size. The junction is biased at 26 m V and the current is measured with a sample rate of 100 Hz. Many conductance traces show plateaus near integer multiples of $2e^2/h$, and often the last plateau in the contact regime is near $2e^2/h$ (FIG. 4). After this smallest possible contact, the jump to the tunnel regime results in almost zero conductance (vacuum tunneling only). Upon close inspection, it is seen that the majority of the plateaus are not at exact integers. Backscattering in these metallic point contacts may be responsible for these observations. The description in terms of conductance channels is still valid, although with transmission coefficients slightly different from one or zero.

Conductance noise is clearly present on the plateaus in FIG. 4. This noise is not due to external disturbances and its amplitude is much larger than the measurement accuracy. In general, two different types of noise can be present. The switching of one or a few atoms between energetically equifavorable positions in the contact region can result in closely spaced conductance levels (inset in upper panel of FIG. 4). The high kinetic energy of the atoms at room temperature can drive them between various sites, thus influencing the conductance. Another type of noise has a more random nature (inset in lower panel of FIG. 4). This may be due to small strain variations and small out-of-equilibrium displacements (small compared to the lattice constant) of a group of atoms comprising the contact.

It should be noted that the transition from contact to tunneling and back is hysteretic. That is indicated in the piezo voltage panel by the two points which coincide with the transitions. The transition from contact to tunneling always occurs at a larger piezo voltage than the reverse transition. This is attributed to the bonding force of the bridging atom and to some elasticity of the front most atoms in the electrode ends.

Figure 6A:
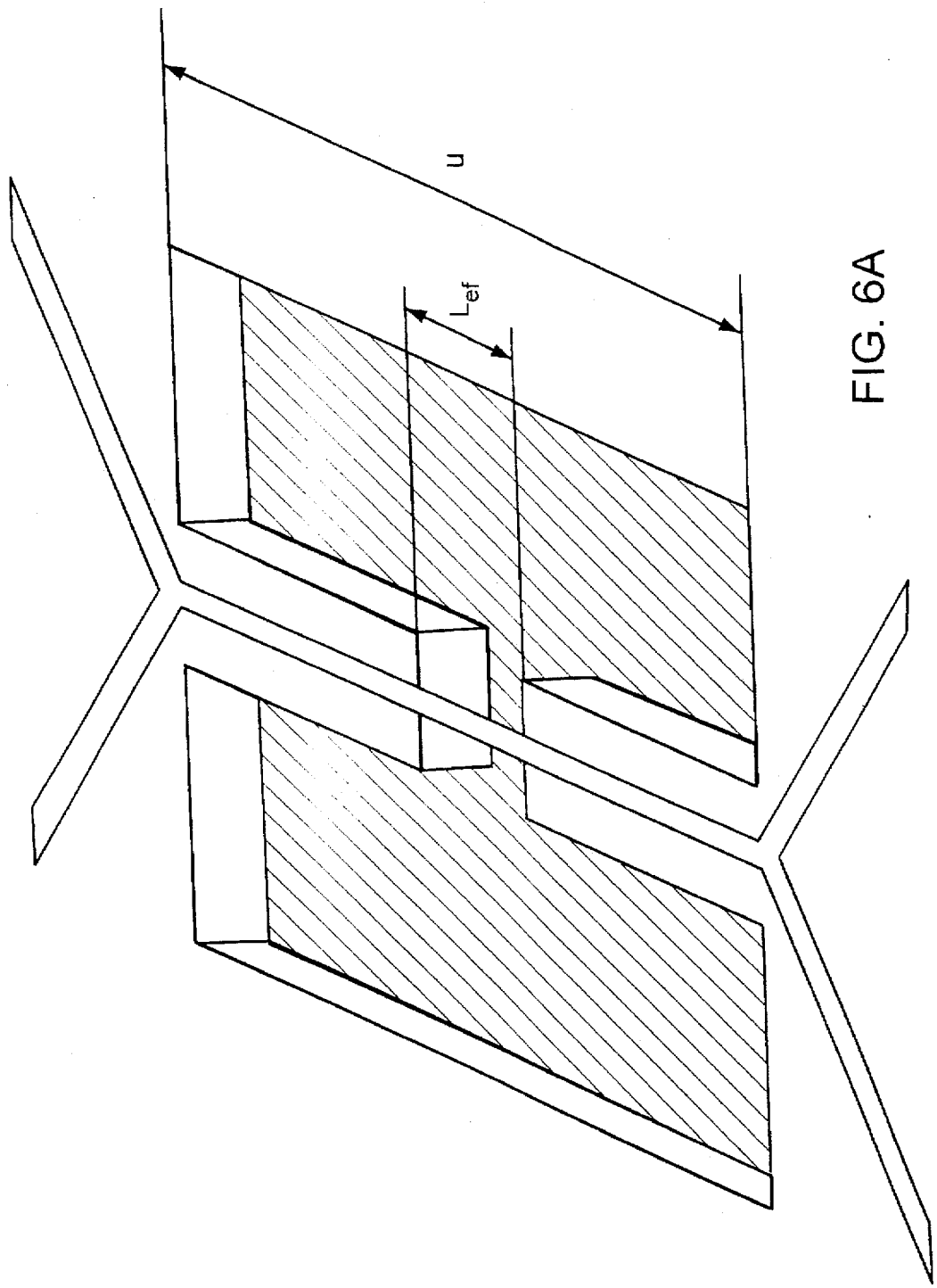
FIG. 6A shows the structure of a sample embodiment of a microfabricated MCB transducer, built from a layered structure as indicated in FIG. 6B.
Figure 6B:
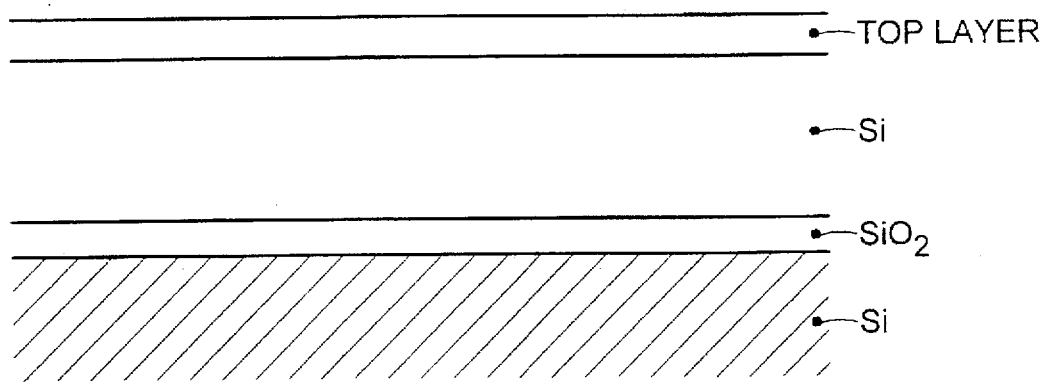
FIG. 6C shows a cross section of the structure shown in FIG. 6A.

FIG. 6A shows an alternative embodiment for MCB devices on a silicon substrate. The starting point is a silicon substrate with a layered structure as indicated in FIG. 6B. The starting material is a thermally oxidized silicon wafer <100, which has a boron implantation layer about 1 μm below the silicon—silicon dioxide interface. First a narrow (100 nm) metal wire is deposited. After this a H-like structure is etched anisotropically through the silicon dioxide, the length $L_{ef}$ is made as small as possible. After etching through the top layer, the underlying silicon is etched isotropically. The implanted boron layer acts as an etch stop. (This layer may be omitted when the long side of the H is lined up with the <110> direction in the surface. In this case a rapid undercut at the convex corners of the cantilevers will occur. See K. E. Petersen, 25 IEEE TRANS'NS ELEC. DEV. 1241 (1978).) At this point the two decks bridged with a metal wire are suspended above the silicon.

Figure 6C:
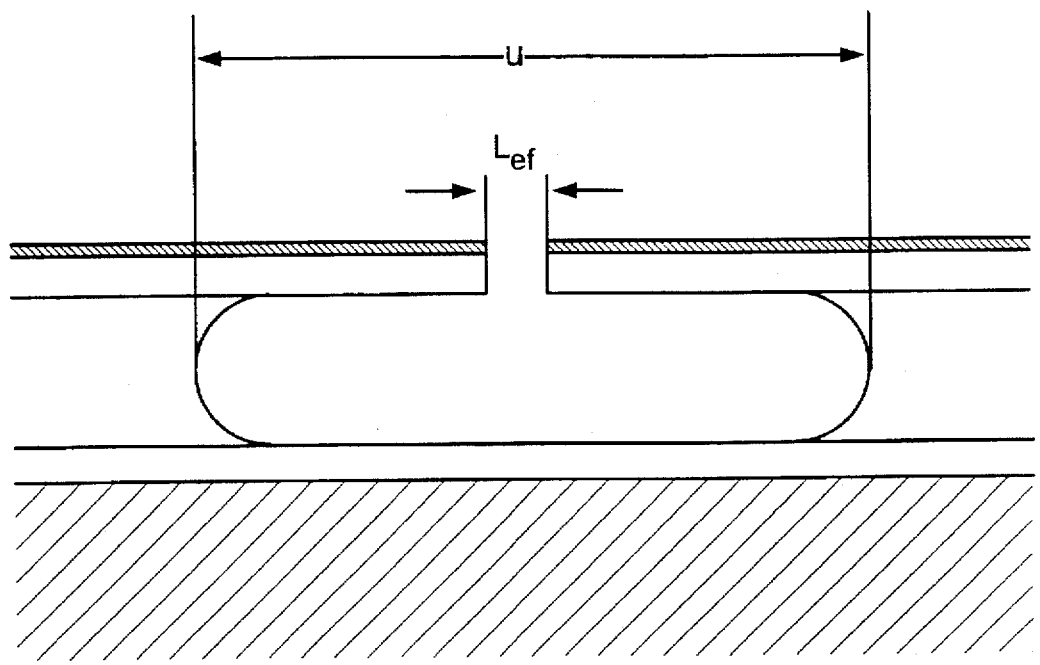

In FIG. 6C a cross section of the completed structure is shown. With $L_{ef} \approx 20$ nm, $u \approx 1$ μm, $L_s \approx 10$ mm and a substrate thickness $h \approx 0.5$ mm, we obtain $r \approx 10^5$ and $u/L_{ef} \approx 50$. The stress concentration factor of 50 should be high enough to break the metal before the Si substrate breaks. The estimated reduction factor is approximately a factor $10^3$ better than what was been obtained so far with the hand made samples and is mainly improved by reducing u to 1 μm.

Cantilever Sensing

Figure 7:
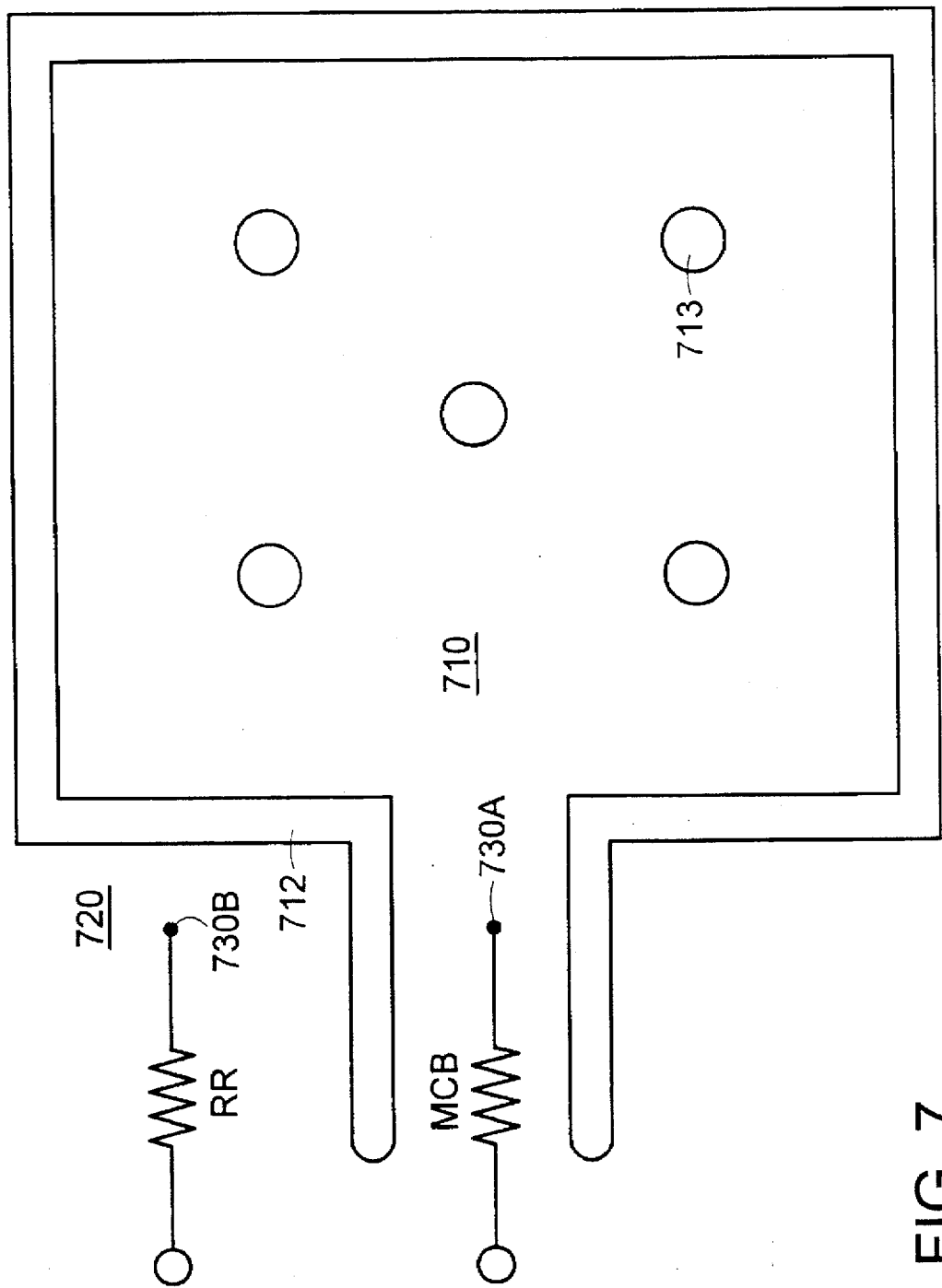
FIG. 7 shows an alternative embodiment in which a tunnelling transducer is mounted on a cantilevered arm.

A different way to use the tunnelling transducer is to mount the break on a cantilevered arm, in order to detect small deflections in the cantilever arm itself. This will provide an adequate sensing relation for some applications (notably accelerometers, and possibly also chemisorption sensors). As shown in FIG. 7, the cantilever arm 710 can itself be used as a return electrode.

FIG. 7 is a plan view of a sample implementation of this embodiment. A transducer MCB is mounted on cantilevered arm 710 which is free-standing. The arm is separated from the surrounding fixed structure by trench 712. In the embodiment shown, an isotropic etch has been used to undercut the arm 710, and additional holes 713 have been opened in the arm 710 so that the available lateral undercut will separate it from the underlying structure. (However, of course many fabrication sequences can be used to produce an undercut cantilever arm.)

An advantage of such cantilever structures is that electrostatic deflection can be used to preload individual cantilevers. If the cantilever arm is constructed in e.g. polysilicon over oxide, then electrostatic preload (with respect to a conductive substrate under the arm) can be applied simply by varying the DC bias voltage on the arm. Thus in this case it may be preferable not to route the transducer's return path through the arm.

In alternative embodiments many other cantilever geometries can of course be used.

Electrical Detection

Several electrical configurations can be used for sensing the varying impedance of a tunnel gap. The two basic choices are constant-voltage or constant-current modes, but various modified and combined approaches can be used instead.

Figure 8:
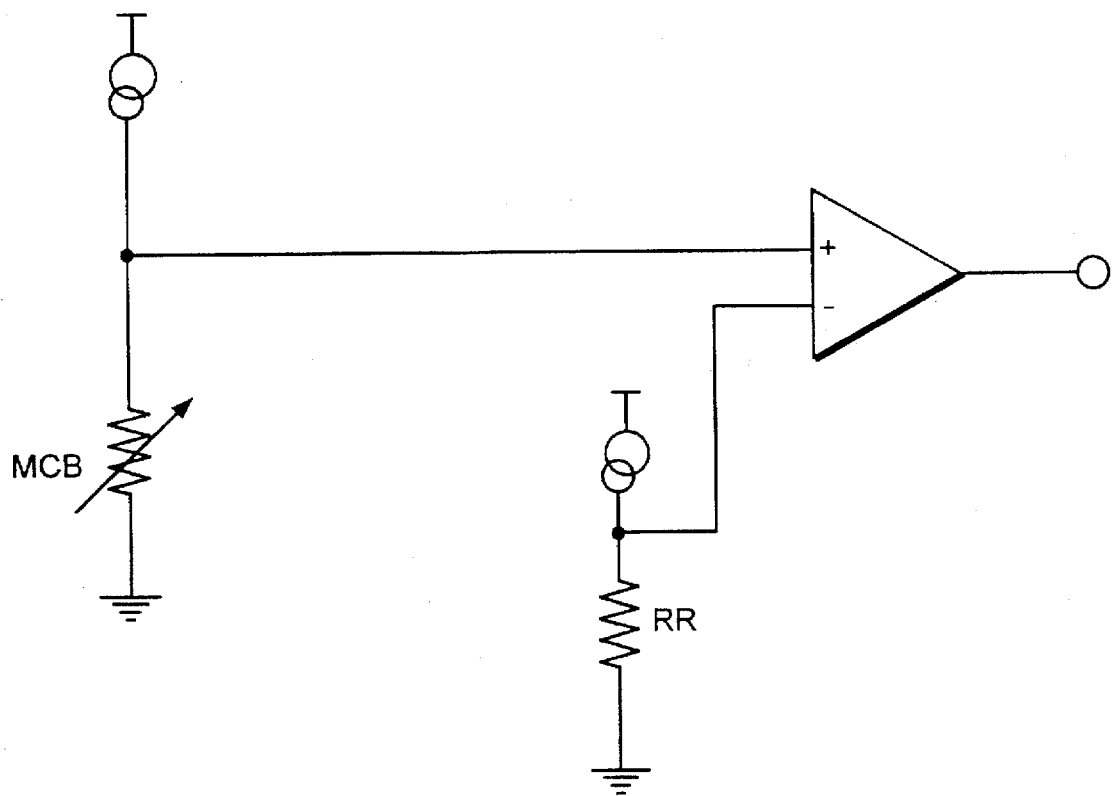
FIG. 8 shows a sample embodiment of an integrated sensor which includes a first amplification stage integrated on-chip with a tunnelling transducer.

FIG. 8 shows a sample electrical configuration for sensing the variation in impedance of a tunnelling transducer. In this embodiment a differential bipolar stage provides initial differential amplification between a tunnelling transducer MCB and a reference element RR. The reference element RR may be a meander line of the same conductor which forms the tunnelling transducer MCB, but is more preferably another tunnelling transducer which is less directly coupled to the external condition being sensed. For example, in sensor embodiments which use substrate deflection, this reference transducer may be oriented at right angles to the primary transducer. For another example, where the primary transducer is located on a cantilever arm, the reference transducer can be located over substrate. For another example, a deep trench can be etched under the primary transducer gap, but not under the gap of the reference transducer which can be located over substrate.

Alternatively, the described structure can also be used to provide discrete rather than analog sensing: the rapid current change through the tunnelling region can be used simply to provide an on-off indication of deflection. Thus this principle of operation can even be used to construct a three-terminal device in which (for example) a bias voltage is applied to a third terminal to cause an electrostatic deflection force which preloads the MCB transducer.

Metallization

The choice of metal is not particularly critical. However, it is preferable to choose a metal which does NOT form a native oxide.

Fabrication Alternatives

In terms of microscopic fabrication, the MCB is simply an air bridge. Thus the various techniques used for air bridge fabrication (e.g. NALO, nitride-assisted liftoff) can be adapted, or other undercutting techniques can be used.

Due to the stress concentration effects discussed above, breaking is no problem. However, if desired various methods can be used to facilitate breaking, e.g. by stressing the fabricated structure (before or after packaging), or by applying thermal shock, or by using electromigration to induce further narrowing of the necked-down conductor portion, or by using an etch which preferentially attacks grain boundaries with a material (such as polysilicon) with noncolumnar grain structure.

Multi-Transducer Sensors

An implementation problem is that the change in current may take us "off-scale". One way around this would be to mount multiple MCBs with different degrees of mechanical coupling, so that the mechanical movement would open the different MCBs at different rates —thus their sensitive regions could be "pieced" together in logic, without incurring deformation on any due to subminimum spacing.

Mechanical Biasing

In applications where the transducer senses substrate deflection, it may be useful to apply a mechanical bias to keep the gap in the tunnelling regime. This is particularly useful where a "reset condition" is available, e.g. with vehicular accelerometers. In such applications an external piezo or motor adjustment can be used to reoptimize the break spacing at each startup or reset event.

Packaging

Several options are available to encapsulate and mount a microelectronic deformation-sensing element according to the present invention. The preferred option is to use a conventional epoxy for encapsulation (preferably in a relatively low-molecular-weight formulation). Alternatively the sensor device can be enclosed in a hermetically sealed cavity if need be.

According to a disclosed class of innovative embodiments, there is provided: A sensor comprising: a conductor having a gap therein which varies dynamically from a minimum value of at least about zero Ångstroms to a maximum value which is less than about thirty ÅAngstroms; and circuitry connected to sense the impedance of said gap.

According to another disclosed class of innovative embodiments, there is provided: A sensor comprising: a conductor having a gap therein which varies dynamically within a range from a minimum value of at least about zero Ångstroms to a maximum value which is less than about thirty Ångstroms, in dependence on a condition which is to be sensed; circuitry operatively connected to sense the impedance of said gap; and circuitry connected to translate the sensed value of said tunnelling current and accordingly provide an output value which indicates the value of said condition.

According to another disclosed class of innovative embodiments, there is provided: A sensor comprising: a support element; a conductor having a gap therein, said conductor being mounted to said support element in a mechanical relation such that deflection of said support element causes variation in the minimum spacing across said gap; and circuitry connected to sense the impedance of said gap.

According to another disclosed class of innovative embodiments, there is provided: A sensor comprising: a semiconductor substrate; a thin-film conductor supported by said substrate, and having a gap therein which varies dynamically from a minimum value of at least about zero Ångstroms to a maximum value which is less than about thirty Ångstroms; and at least one transistor, integrated in said substrate, connected to sense the impedance of said gap.

According to another disclosed class of innovative embodiments, there is provided: A method for sensing a condition, comprising the steps of: a) providing a conductor having a gap therein of less than about 10 Ångstroms which varies in accordance with the condition to be sensed; b) measuring a parameter which corresponds to the impedance of tunnelling current across said gap; and c) translating said parameter to provide an indication of the condition to be sensed.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

For example, the innovative device can be operated in constant-voltage or constant-current sensing modes, or in hybrid or nonlinear biasing modes.

As noted above, various methods can be used to assist break formation in the thin-film structure. For example, the break can be induced by thermal shock, e.g. by briefly spraying an intermediate structure, with exposed metallization, with a cold liquid (e.g. chilled DI water or liquid nitrogen). (Depending on the degree of thermal shock applied, such methods may require that long straight metal lines should not be used anywhere, i.e. all other metal lines should be meandered.) Alternatively flexure of the substrate can be used to facilitate breakage.

In other embodiments, the gap is surrounded by a controlled gaseous atmosphere, or it is surrounded by liquid. Also, the conductors are at ambient temperature or ambient temperature and pressure.

What is claimed is:

1. A sensor comprising:

a first conductor and a second conductor positioned to form a gap therebetween which varies dynamically, in response to an external condition being sensed, from a minimum value of at least about zero Ångstroms to a maximum value which is less than about thirty Ångstroms; and circuitry connected to sense the electrical impedance of said gap by detection of a tunneling current through said gap, wherein said electrical impedance of said gap varies in response to said gap varying.

2. The sensor of claim 1, wherein said gap is surrounded by a controlled gaseous atmosphere.

3. The sensor of claim 1, wherein said gap is surrounded by liquid.

4. A sensor comprising:

a first conductor and a second conductor positioned to form a gap therebetween which varies dynamically, in response to an external condition being sensed, from a minimum value of a least about zero Ångstroms to a maximum value which is less than about thirty Ångstroms, wherein said first and second conductors are at ambient temperature; and circuitry connected to sense the electrical impedance of said gap by detection of a tunneling current through said gap, wherein said electrical impedance of said gap varies in response to said gap varying.

5. The sensor of claim 4, wherein said first and second conductors are at ambient temperature and pressure.

6. A sensor comprising:

a first conductor and a second conductor positioned to form a gap therebeween which varies dynamically, in response to an external condition being sensed, within a range from a minimum value of at least about zero Ångstroms to a maximum value which is less than about thirty Ångstroms;

circuitry operatively connected to sense the electrical impedance of said gap by detection of a tunneling current through said gap, wherein said electrical impedance of said gap varies in response to said gap varying; and circuitry connected to translate the sensed value of said tunneling current and accordingly provide an output value which indicates the value of said external condition.

7. The sensor of claim 6, wherein said gap is surrounded by a controlled gaseous atmosphere.

8. The sensor of claim 6, wherein said gap is surrounded by liquid.

9. The sensor of claim 6, wherein said first and second conductors are at ambient temperature.

10. The sensor of claim 6, wherein said first and second conductors are at ambient temperature and pressure.

11. A sensor comprising:

a support element;

a first conductor and a second conductor positioned to form a gap therebetween, said conductors being mounted to said support element in a mechanical relation such that deflection of said support element causes variation in the spacing across said gap; and circuitry connected to sense the electrical impedance of said gap, wherein said electrical impedance of said gap varies in response to said gap varying.

12. The sensor of claim 11, wherein said support element is monocrystalline silicon.

13. The sensor of claim 11, wherein said first and second conductors are at ambient temperature and pressure.

14. The sensor of claim 11, wherein said gap is surrounded by a controlled gaseous atmosphere.

15. The sensor of claim 11, wherein said gap is surrounded by liquid.

16. The sensor of claim 11, wherein said first and second conductors are at ambient temperature.

17. A method for sensing a condition, comprising the steps of:

(a) using a first conductor and a second conductor to form a gap therebeween of less than about 10 Ångstroms which varies in accordance with the condition to be sensed;

(b) measuring a parameter which corresponds to the electrical impedance of said gap under tunneling current conditions; and (c) translating said parameter to provide an indication of the condition to be sensed.

18. A sensor comprising:

a semiconductor substrate;

a first thin-film conductor and a second thin-film conductor supported by said substrate, and forming a gap therebetween which varies dynamically, in response to an external condition being sensed, from a minimum value of at least about zero Ångstroms to a maximum value which is less that about thirty Ångstroms; and at least one solid state gain stage, integrated in said substrate, connected to sense an electrical impedance of said gap by detection of a tunneling current through said gap, wherein said electrical impedance of said gap varies in response to said gap varying.

19. The sensor of claim 18, wherein said semiconductor is monocrystalline silicon.

20. The sensor of claim 18, wherein said gap is surrounded by a controlled gaseous atmosphere.

21. The sensor of claim 18, wherein said gap is surrounded by liquid.

22. The sensor of claim 18, wherein said conductors are at ambient temperature.

23. The integrated circuit of claim 18, wherein said first and second thin-film conductors are at ambient temperature and pressure.

* * * * *

UNITED STATES PATENT AND TRADEMARK OFFICE
CERTIFICATE OF CORRECTION

PATENT NO. : 5,751,156
DATED : 5/12/98
INVENTOR(S) : Chrisitian Muller, Chong, Mark Reed It is certified that error appears in the above-identified patent and that said Letters Patent is hereby corrected as shown below:

Column 1, after the title insert the following:

The invention identified above is a subject invention under 35 U.S.C. 200, et seq., and the Standard Patent Rights Clause at 37 C.F.R. 401.14 or F.A.R. 52.227-11, which are included among the terms of the above-identified grant/contract award from the Public Health Service/National Institutes of Health.

Signed and Sealed this

Thirteenth Day of April, 1999

Attest:

Q. TODD DICKINSON

*Attesting Officer*  *Acting Commissioner of Patents and Trademarks*